United States Patent [19]
Hentschel et al.

[11] 3,988,641
[45] Oct. 26, 1976

[54] PHASE BREAKDOWN- AND NULL CURRENT-DETECTOR, ESPECIALLY FOR AN ELECTRONIC MOTOR PROTECTION RELAY POSSESSING CURRENT-DEPENDENT TRIGGERING

[75] Inventors: Michael Hentschel, Hannover, Germany; Heinz Unterweger, Buchs, Switzerland

[73] Assignee: Sprecher & Schuh AG, Aarau, Switzerland

[22] Filed: Sept. 30, 1975

[21] Appl. No.: 618,210

[30] Foreign Application Priority Data
Oct. 1, 1974 Switzerland............ 13218/74

[52] U.S. Cl. ............ 317/13 B; 317/31; 317/33 R; 317/36 TD
[51] Int. Cl.² ............ H02H 7/08
[58] Field of Search ............ 317/13 R, 13 B, 31, 317/33 R, 36 TD, 40 R

[56] References Cited
UNITED STATES PATENTS
3,808,503 4/1974 Hentschel............ 317/13 B
3,845,354 10/1974 Boothman et al............ 317/13 B Primary Examiner—Harry Moose
Attorney, Agent, or Firm—Haseltine, Lake & Waters

[57] ABSTRACT
A phase breakdown- and null current detector, especially in or for an electronic motor protection relay with current-dependent response or triggering, which is controlled by detection alternating-current voltages proportional to current values in the motor outer conductors and contains an electrical motor simulator representative of the thermal or heating behavior of the motor due to the charging operation of a capacitive storage. The motor simulator can be adjusted by a controlled switching device to different time-constants corresponding to the operating conditions of the motor. At the input side of a voltage comparator-circuit arrangement there are electrically connected circuit elements for comparison of the mean or average value of a measurement voltage obtained by rectification of the detection alternating-current voltages with at least one comparison voltage in such a manner that in the presence of an asymmetry of the detection alternating-current voltages greater than a predetermined asymmetry of such detection alternating-current voltages there is delivered by the voltage comparator-circuit arrangement an output signal as a phase breakdown-reporting or indicator signal and with detection alternating-current voltages smaller than a predetermined minimum amplitude there is delivered an output signal as the null current-reporting or indicator signal. Further, the voltage comparator-circuit arrangement contains a first output channel embodying a peak value-rectifier arrangement for the phase breakdown-reporting signals and a second direct output channel for the null current-reporting signals.

9 Claims, 2 Drawing Figures

3,988,641

PHASE BREAKDOWN- AND NULL CURRENT-DETECTOR, ESPECIALLY FOR AN ELECTRONIC MOTOR PROTECTION RELAY POSSESSING CURRENT-DEPENDENT TRIGGERING

BACKGROUND OF THE INVENTION

The present invention relates to a new and improved construction of phase breakdown- and null current-detector, especially for an electronic motor protection relay with current-dependent triggering, which is controlled by detection alternating-current voltages peoportional to the current values in the motor outer or external conductors and contains an electrical motor simulator for simulating the thermal behavior of the motor due to the charging operation of a capacitive storage, the motor simulator can be adjusted to different time-constants corresponding to the operating conditions of the motor by means of a controlled switching device.

In Swiss Pat. No. 541,885 there is taught to the art a circuit arrangement for the recognition or detection of defects or faults brought about by a phase breakdown or ground short in the current supply of a three-phase motor by means of detection alternating-current voltages proportional to current values in the motor outer conductors. There is provided a time-multiplex device and a rectifier circuit arrangement connected in series therewith in order to generate from the detection alternating-current voltages by means of cyclically successive samples a time-multiplex signal possessing signal amplitudes and signal frequency determined by the detection alternating-current voltages. For instance, from the positive portion of the time-multiplex signal there is formed a measurement voltage by smoothing or forming a mean value, the amplitude of which is approximately proportional to the peak value of the maximum detection alternating-current voltage or the arithemtic means value of the detection alternating-current voltages. For the purpose of phase breakdown-detection it is possible after differentiating the time-multiplex signal to compare in a comparator the voltage pulses possessing the maximum amplitude value with a percentual portion of the measurement voltage. By means of this comparison there is gradually detected and evaluated the asymmetry in the detection alternating-current voltages which arise during phase breakdown. For ground short detection there is derived from the time-multiplex signal by means of a low-pass filter for signal components occurring at the frequency of the detection alternating-current voltages the peak value which is compared in a second comparator with another percentual portion of the measurement voltage. Such circuit arrangements operate accurately and reliably, but are rather complicated.

Electronic protection relays for electrical operating means or equipment, such as transformers and especially motors, contain for the electrical simulation of the heating behavior thereof RC-elements which are supplied with a charging current which is dependent upon the operating current. The charging voltage of the capacitors is compared with a comparison voltage characteristic of the permissible boundary or threshold temperature of the operating means and, as soon as the charging voltage exceeds the comparison voltage, the protection relay responds and cuts-off the operating current. In order to be able to take into account the different heating behavior between an operating or running motor and a stationary motor, which is essential for any operation having intermittent standstill times, there has already been proposed to the art, for instance as taught in Swiss Pat. No. 540,587, to construct the simulator so that it can be switched to different time-constants, wherein the switching operation occurs by means of an electronic switching element, for instance a transistor, controlled by appropriate control signals. In this regard there can be obtained in part very large time-constants which, in the case of a direct-current supply of the simulator, only can be realized with extremely low charging currents and extremely high resistances. In such instances the charging current is supplied in a clocked or timed fashion to the simulator, and accordingly, there can be provided between the charging current source and the simulator an electronic switch controlled by a clock generator.

The clocking of the charging current for the simulator renders possible different advantageous possibilities for an electronic motor protection relay. Thus, for instance, there has already been proposed from Swiss Pat. No. 534,444 to make the clock frequency proportional to the measurement voltage in order to obtain a triggering or release characteristic corresponding to the protected object. The clock generator then contains, for instance, an integrator for the measurement voltage which in each instance is reset at a predetermined voltage value. Accordingly, electronic protection relays, depending upon requirements, can be relatively simple and inexpensive devices, but also rahter complicated and thus expensive precision devices.

SUMMARY OF THE INVENTION

Hence, it is a primary object of the present invention to provide an improved phase breakdown- and null current-detector, especially for an electronic motor protection relay, which is not associated with the aforementioned drawbacks and limitations of the prior art proposals.

Another and more specific object of the present invention aims at the provision of a new and improved construction of phase breakdown- and null current-detector, especially for an electronic motor protection relay, which while nonetheless possessing a relatively simple construction reliably and accurately indicates phase breakdown- and null current by means of reporting or indicating signals, so that it so-to-speak can be incorporated as a component to advantage in random electronic protection relays, both of simple and complicated construction.

Now in order to implement these and still further objects of the invention which will become more readily apparent as the description proceeds, the phase breakdown- and null current-detector or detector circuit of this development is manifested by the features that at the input side of a voltage comparator-circuit arrangement there are connected circuit elements for the comparison of the mean or average value of a measurement voltage obtained by rectification of the detection alternating-current voltage with at least one comprison voltage in such a manner that in the case of an asymmetry of the detection alternating current voltages greater than a predetermined asymmetry there is delivered by the voltage comparator-circuit arrangement an output signal as a phase breakdown-indicating or reporting signal and in the case of a detection alternating-current voltage which is smaller than a predetermined minimum amplitude there is delivered an output signal as the null current-indicating or reporting signal. Further, the voltage comparator-circuit arrangement possesses a first output channel containing a peak value rectifier for the phase breakdown-reporting signals and a second, direct output channel for the null current-reporting signals.

Hence, the phase breakdown- and null current-detector of this development accordingly essentially only possesses one voltage comparator-circuit arrangement and a simple circuit arrangement or configuration at the input side and the output side for the application of input voltages and the tapping-off of output signals. In this regard the voltage comparator-circuit arrangement for the phase breakdown detection can contain a first voltage comparator, at the one input of which there is applied by means of a voltage divider a predetermined fraction of the measurement voltage as the comparison voltage and at the output of which there is connected the first output channel, and for the null current-detection contains a second voltage comparator at the one input of which there is applied a predetermined constant voltage as the comparison voltage and at the output of which there is connected the second output channel. At the other input of the voltage comparator for the phase breakdown-detection and the voltage comparator for the null current-detection there can be applied the mean or average value of the measurement voltage. The first output channel of the voltage comparator-circuit arrangement, in addition to the peak value-rectifier arrangement, can contain a time-delay element in order to eliminate a response to rapid changes of the motor current as a function of time during normal operation and to form from the pulse-shaped output signal a continuous signal.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
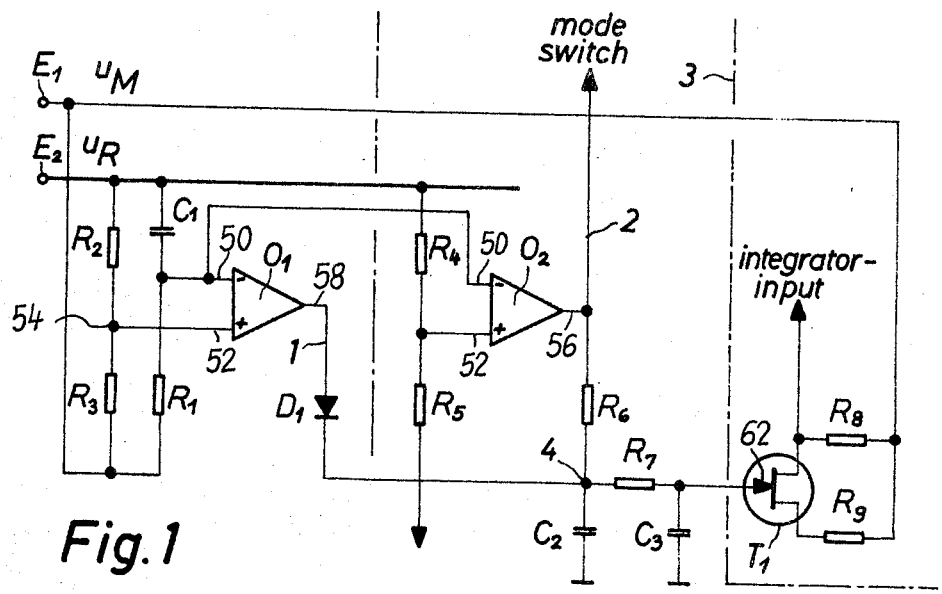
FIG. 1 is a circuit diagram of a phase breakdown- and null current-detector or detector circuit for the accelerated triggering of an electronic motor protection relay in the event of phase breakdown wherein the motor simulator is supplied with a clock charging current.

Describing now the drawing, the exemplary embodiment of phase breakdown- and null current-detector or detector circuit illustrated in a simplified circuit diagram in FIG. 1 will be understood to contain for the phase breakdown-detection a first voltage comparator $O_1$ and for the null current-detection a second voltage comparator $O_2$, both of which are conventional operational amplifiers each possessing a respective inverting input 50 and a respective non-inverting input 52. This detector circuit arrangement furthermore has a first input $E_1$ at which there is applied a measurement voltage $U_M$ and a second input $E_2$ at which there is applied a constant reference voltage $U_R$, all voltage values of the circuit arrangement being related to this reference voltage $U_R$. At both inputs $E_1$, $E_2$ there is connected an RC-element $R_1$, $C_1$ at which there is tapped-off the mean or average value of the measurement voltage $U_M$ and such is applied to the inverting input 50 of the first voltage comparator $O_1$. At the inputs $E_1$, $E_2$ there is additionally connected a voltage divider $R_2$, $R_3$, by means of the center tap 54 of which there is applied to the non-inverting input 52 of the voltage comparator $O_1$ an always constant percentual portion of the measurement voltage $U_M$. Leading away from the voltage comparator $O_1$ is a first output channel 1 which contains a peak value rectifier or rectifier arrangement with the diode $D_1$ and the capacitor $C_2$ as well as a time-delay element composed of the resistor $R_7$ and the capacitor $C_3$. Hence, the voltage comparator $O_1$ thus compares the mean value of the measurement voltage $U_M$ with a part of such measurement voltage, with the result that there is determined the degree of symmetry of the detection alternating-current voltages and by means of the same that of the motor current, as such has been described in detail in the previously mentioned Swiss Pat. No. 541,885, the disclosure of which is incorporated herein by reference; also the disclosure of the other heretofore mentioned patents are incorporated herein by reference. With increasing non-symmetry of the motor current and with constant peak value of the measurement voltage $U_M$, the mean or average value of the measurement voltage decreases and the voltage divider $R_2$, $R_3$ is designed such that with a predetermined non-symmetry of the motor currents, for example $I_{max} = I_{min}$, the voltage comparator $O_1$ just switches-through in the case of a mean value at the non-inverting input 52 which falls below the voltage. The peak value of the measurement voltage $U_M$ appears periodically with the network frequency (50 Hz) and with harmonics of this frequency and the voltage comparator $O_1$, at the region of the response threshold, delivers as the output signal needle-like or spike pulses of only small time duration. By means of the peak value-rectifier arrangement via the diode $D_1$ and the capacitor $C_2$ there is obtained from such spike pulses at the circuit terminal or junction 4 a control voltage of constant voltage peak. For the formation of the mean value from the measurement voltage $U_M$ (RC-element $R_1$, $C_1$) there is of course required a certain time. With rapid changes of the motor current the voltage at the inverting input of the voltage comparator trails the momentarily correct mean value of the measurement voltage, so that also during normal operation a rapid increase of the motor current can cause response of the voltage comparator $O_1$. In order to prevent false triggering of the motor protection relay which is thus brought about there is connected in series with the output channel 1 of the peak value-rectifier arrangement $D_1$, $C_2$ the appropriately designed time-delay element $R_7$, $C_3$.

In the case of the second voltage comparator $O_2$ which is provided for the null current-detection the inverting input 50 thereof is connected in circuit with the inverting input 50 of the first voltage comparator $O_1$, so that at this inverting input of the voltage comparator $O_2$ there likewise appears the mean or average value of the measurement voltage $U_M$. At the non-inverting input 52 of the voltage comparator $O_2$ there is applied a constant comparison voltage through the agency of a voltage divider $R_4$, $R_5$ which is connected with the reference voltage input $E_2$, this comparison voltage corresponding to a certain portion or part of the motor current, for instance $0.3 I_N$. If the mean value of the measurement voltage $U_M$ falls below the comparison voltage, then, the voltage comparator $O_2$ switches-through and delivers at its output 56 a null current-reporting or indicating signal. For the null current-detection it would be basically possible to also compare the measurement voltage $U_M$ itself with the constant comparison voltage. Since then in the case of phase breakdown owing to the periodically occurring minimum values of the measurement voltage the null current-detector would also periodically respond, the measurement voltage $U_M$ should not be applied directly at the inverting input 50 of the voltage comparator $O_2$, rather via a smoothing element similar to the RC-element $R_1$, $C_1$ for mean value formation. Hence, by means of the null current-voltage comparator $O_2$ there is accordingly compared the measurement voltage and its mean value with a constant comparison voltage and upon falling below the comparison voltage the motor is assumed to be at standstill or stationary. At the output 56 of the voltage comparator $O_2$ there is connected the second output channel 2 which leads to a mode switch 60 for the stationary and running operating modes of the motor.

By means of the exemplary embodiment of phase breakdown- and null current detector illustrated in FIG. 1 there is controlled an electronic motor protection relay, the motor simulator of which is supplied by a clocked charging current. The clock frequency in this case, as previously mentioned, should be proportional to the measurement voltage $U_M$, and to that end there is provided in the motor protection relay a clock generator with an integrator 3 wherein in the arrangement of FIG. 1 there is only illustrated the input resistor $R_8$ to which there is applied the measurement voltage $U_M$. By means of the motor simulator the motor current is turned-off when during normal operation the motor has heated-up to its boundary or threshold temperature. In the case of phase breakdown it is accordingly necessary to insure for a more rapid triggering of the protective or protection relay corresponding to the changed thermal or heating behavior of the motor. This requires an appropriate control of the protection relay by the phase breakdown-detector. In the case of current interruption, for instance a pause in operation, the measurement voltage $U_M$ which is derived from the motor current becomes null, and when the protection or protective relay contains an integrator which integrates the measurement voltage then also with the disappearance of the measurement voltage $U_M$ the integrator ceases to operate, so that the simulation of the cooling characteristics of the motor can become disturbed. In order to take both situations into account, in the circuit arrangement of FIG. 1 a resistor $R_9$ is connected in parallel to the input resistor $R_8$ of the integrator 3 via an electronic switch, for instance via the source-drain-path of a field-effect transistor $T_1$. The electronic switch, field-effect transistor $T_1$, is closed by the phase breakdown-reporting or indicating signal, so that with phase breakdown, by parallelly connecting the resistor 9 with the resistor $R_8$, it is possible via the thus resulting increase of the clock frequency at the integrator to lower the triggering-boundary current and to bring about an accelerated triggering. To this end the output 58 of the phase breakdown-voltage comparator $O_1$ is connected by means of the first output channel 1 with the gate 62 of the field-effect ransistor $T_1$. Furthermore, the output 56 of the null current-voltage comparator $O_2$ is connected by means of a resistor $R_6$ with the circuit junction or terminal 4 of the output channel 1, so that by means of the null current-reporting signal and via the resistors $R_6$ and $R_7$ and the p-n-junction which is poled in the forward or conducting direction between the gate and the source-drain channel of the field-effect transistor $T_1$ a current flows in the integrator input, so that the integrator 3 also can be driven even when the measurement voltage $U_M = 0$. Apart from maintaining in operation the integrator, the conductive-switching of the field-effect transistor $T_1$ by the null current-reporting signal remains without effect, since the measurement voltage $U_M$ in this case of course is equal to null.

Figure 2:
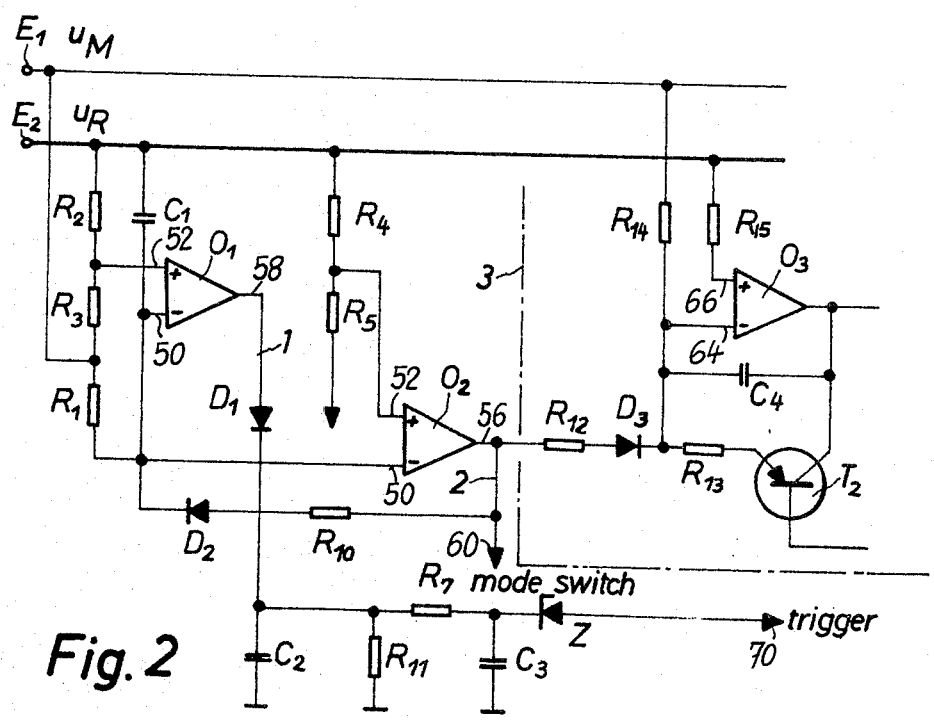
FIG. 2 is a circuit diagram of a phase breakdown and null current-detector for the direct triggering of an electronic motor protection relay in the event of a phase breakdown, wherein again the motor simulator is supplied with a clocked charging current.

FIG. 2 illustrates in greater detail a circuit arrangement for direct triggering in the case of phase breakdown. The phase breakdown- and null current-detector is, in this instance, similarly constructed as the circuit arrangement of FIG. 1, that is to say, the phase breakdown-voltage comparator $O_1$ compares the mean value of the measurement voltage $U_M$ which is applied via the RC-element $R_1$, $C_1$ at the inverting input 50 with a part of the measurement voltage $U_M$ applied via the voltage divider $R_2$, $R_3$ at the non-inverting input 52, and the null current-voltage comparator $O_2$ compares the mean value of the measurement voltage $U_M$ which is applied at the inverting input 50 with the constant comparison voltage which is supplied via the voltage divider $R_4$, $R_5$ at the non-inverting input 52. The motor protection relay here again contains an integrator 3 which as usual comprises an operational amplifier $O_3$. At the inverting input 64 of the operational amplifier $O_3$ there is applied via a resistor $R_{14}$ the measurement voltage $U_M$ and at the non-inverting input 66 there is applied via a resistor $R_{15}$ the reference voltage $U_R$. The capacitor $C_4$ of the integrator 3, is shunted by a resistor $R_{13}$ and the collector-emitter-path of a transistor $T_2$ in order to reset the integrator by rendering conductive the transistor $T_2$ upon reaching in each case a predetermined output voltage value.

The output channel 1 which leads away from the output 58 of the phase breakdown-voltage comparator $O_1$ again contains the peak value-rectifier arrangement incorporating the diode $D_1$ and the capacitor $C_2$, as well as the time-delay element embodying the resistor $R_7$ and the capacitor $C_3$. In contrast to the circuit arrangement of FIG. 1 in this case the output channel 1 however is connected via a Zener diode Z directly at the trigger 70 of the motor protection relay.

At the output 56 of the null current-voltage comparator $O_2$ there is connected the direct, second output channel 2 by means of which with null current the mode switch 60 has applied thereto the control signals. The ouput 56 of the voltage comparator $O_2$ is additionally connected via a resistor $R_{12}$ and a diode $D_3$ with the inverting input 64 of the operational amplifier $O_3$, so that the integrator 3 in the case of null current, i.e. also when the measurement voltage $U_M = 0$, continues to operate. Furthermore, output 56 is connected by means of a resistor $R_{10}$ and a diode $D_2$ with the inverting input 50 of the phase breakdown-voltage comparator $O_1$, so that also for this operational amplifier $O_1$ in the case of null current and with the measurement voltage $U_M = 0$ there are present clear operating conditions with defined output voltage.

While there is shown and described present preferred embodiments of the invention, it is to be distinctly understood that the invention is not limited thereto, but may be otherwise variously embodied and practiced within the scope of the following claims.

Accordingly,

1. A phase breakdown- and null current detector, especially for an electronic motor protection relay with current-dependent triggering which is controlled by detection alternating-current voltages proportional to current values in the motor outer conductors, an electrical motor simulator simulating the thermal behavior of the motor by means of the charging operation of a capacitive storage, a controlled switching device for adjusting the motor simulator to different time-constants corresponding to the operating conditions of the motor the improvement comprising: a voltage comparator-circuit arrangement having an input side and an output side, circuit elements connected at the input side of the voltage comparator-circuit arrangement for the comparison of a mean value of a measurement voltage obtained by rectification of the detection alternating-current voltages with at lest one comparison voltage in such a manner that in the presence of a greater asymmetry of the detection alternating-current voltages than a predetermined asymmetry there is delivered an output signal as a phase breakdown-reporting signal and in the case of detection alternating-current voltages smaller than a predetermined minimum value there is delivered an output signal as a null current-reporting signal, said voltage comparator-circuit arrangement containing a first output channel having a peak value-rectifier arrangement for the phase breakdown-reporting signals and a second direct output channel for the null current-reporting signals.

2. The detector as defined in claim 1, wherein the voltage comparator-circuit arrangement for the phase breakdown-detection comprises a first voltage comparator having an input and an output, a predetermined fraction of the measurement voltage being applied as a comparison voltage at the input by means of a voltage divider comprising part of said circuit elements and at its output there is connected the first output channel, a second voltage comparator having an input and an output and serving for the null current-detection, a predetermined constant voltage being applied to the input of the second voltage comparator as the comparison voltage and the second output channel being connected at the output of the second voltage comparator.

3. The detector as defined in claim 2, wherein the first voltage comparator for the phase breakdown-detection has a further input at which there is applied the measurement voltage via a RC-element forming the mean value of said measurement voltage, said RC-element comprising a further part of said circuit elements.

4. The detector as defined in claim 2, wherein the second voltage comparator for the null current-detection has a further input at which there is applied the measurement voltage via a RC- element forming the mean value of said measurement voltage, said RC-element a further part of said circuit elements.

5. The detector as defined in claim 1, wherein the first output channel of the voltage comparator-circuit arrangement is further provided with a time-delay element.

6. The detector as defined in claim 2, for an electronic motor protection relay having a motor simulator which is supplied with a clocked charging current at a repetition frequency which is proportional to the measurement voltage, a clock generator containing an integrator for the measurement voltage, the integrator being connected with the output of the voltage comparator for the null current-detection and being maintained in operation when the measurement voltage is equal to null by the null current-reporting signal.

7. The detector as defined in claim 6, wherein the integrator has an input resistor, an electronic switch, a resistor element connected in parallel via the electronic switch with the input resistor of the integrator, and wherein the electronic switch is switched into its conductive state via the first output channel by means of the phase breakdown-reporting signal in order to increase the clock frequency for accelerated triggering during phase breakdown by parallelly connecting in circuit the integrator-input resistor and thereby reducing the triggering-threshold current.

8. The detector as defined in claim 7, wherein the first output channel of the voltage comparator-circuit arrangement is further provided with a time-delay element comprising a resistor and a capacitor, the electronic switch comprising a field-effect transistor having a gate, said gate being connected in circuit with the first output channel, said gate further being connected by means of the resistor of the time-delay element and a resistor means with the output of the null current-voltage-comparator in order to maintain the integrator in operation when the measurement voltage equals null by means of a gate-current flowing through the field-effect transistor in the presence of a null current-reporting signal.

9. The detector as defined in claim 6, wherein the first output channel is directly connected at a trigger of the motor protection relay, the output of the null current-voltage comparator is connected by means of a first resistor and a first diode with an input of the integrator for the measurement voltage and by means of a second resistor and a second diode with an input of the phase breakdown-voltage detector for the measurement voltage in order to apply to these inputs an auxiliary voltage when the measurement voltage is equal to null.

* * * * *